(12) United States Patent
Sato

(10) Patent No.: US 6,940,655 B2
(45) Date of Patent: Sep. 6, 2005

(54) SUPER WIDE-ANGLE ZOOM LENS SYSTEM

(75) Inventor: Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/463,802

(22) Filed: Jun. 18, 2003

(65) Prior Publication Data
US 2003/0234985 A1 Dec. 25, 2003

(30) Foreign Application Priority Data
Jun. 20, 2002 (JP) ........................ 2002-180327

(51) Int. Cl.[7] .............................. G02B 15/14
(52) U.S. Cl. .......................... 359/680; 359/684
(58) Field of Search .................. 359/691, 680–682, 359/684

(56) References Cited

U.S. PATENT DOCUMENTS

| | | | | |
|---|---|---|---|---|
| 5,329,401 A | * | 7/1994 | Sato | 359/686 |
| 6,169,636 B1 | * | 1/2001 | Kreitzer | 359/691 |
| 6,308,011 B1 | | 10/2001 | Wachi et al. | 396/72 |
| 2002/0057505 A1 | | 5/2002 | Sato | 359/753 |

FOREIGN PATENT DOCUMENTS

| | | |
|---|---|---|
| JP | 11-287953 | 10/1999 |
| JP | 2000-2837 | 1/2000 |
| JP | 2001-159732 | 6/2001 |

* cited by examiner

Primary Examiner—Georgia Epps
Assistant Examiner—Alicia M Harrington
(74) Attorney, Agent, or Firm—Miles & Stockbridge P.C.

(57) ABSTRACT

An object of the present invention is to provide a super wide-angle zoom lens system having an angle of view of $2\omega=100°$ or more, a zoom ratio of about 2, the f-number of about f/4, sufficient amount of peripheral light quantity, high optical performance, and aspherical surfaces capable of being manufactured easily. According to one aspect of the present invention, in order from an object, a first lens group G1 having negative refractive power, and a second lens group G2 having positive refractive power are provided. Zooming is carried out by varying a distance between the first lens group G1 and the second lens group G2. The first lens group G1 has a negative lens component Ln and a positive lens component Lp. The negative lens component Ln has at least one aspherical lens Lasp. The aspherical lens Lasp satisfies given conditional expressions.

29 Claims, 8 Drawing Sheets

SUPER WIDE-ANGLE ZOOM LENS SYSTEM

This application claims the benefit of Japanese Patent application No. 2002-180327 which is hereby incorporated by reference.

BACKGROUND OF THE INVENTION

1. Field of the Invention

The present invention relates to a zoom lens and in particular to a super wide-angle zoom lens system with a large angle of view.

2. Related Background Art

There have been rare proposals of a super wide-angle zoom lens system compact, composed of a small number of lens elements, and having an angle of view $2\omega$ of $100°$ or more in an wide-angle end state. As an example, there is Japanese Patent Application Laid-Open No. 2000-2837 owned by the same assignee as the present application. Moreover, a super wide-angle single focal length lens using an aspherical surface suitable to be manufactured by means of a glass molding has been proposed in Japanese Patent Application Laid-Open No. 2001-159732 owned by the same assignee as the present application. Furthermore, a zoom lens using an aspherical lens suitable to be manufactured by means of a glass molding has been proposed in Japanese Patent Application Laid-Open No. 11-287953.

However, there still have needed more study for high optical performance and lowering its cost for those lenses proposed above-described publications, so that a super wide-angle zoom lens system using an aspherical lens corresponding to an easy manufacturing glass molding has been expected.

The major problems of a super wide-angle zoom lens system are such as compactness for regular use, high optical performance, securing a peripheral quantity of light, and productivity of an aspherical lens. In particular, it is important that an aspherical lens to be used can be easily produced by a current mass production technology.

In view of manufacturing method, that an aspherical lens can be manufactured by the glass molding having high productivity not by a precision grinding having low productivity results in cost down, so that there is a large merit for a user. From this point of view, in an optical system disclosed in Japanese Patent Application Laid-Open No. 2000-2837, the aspherical lens is difficult to be manufactured by the glass molding or the precision grinding instead of compound type aspherical surface made of glass and resin, so that the productivity is low. Moreover, a peripheral quantity of light and aberrations are necessary to be improved.

The zoom lens disclosed in Japanese Patent Application Laid-Open No. 11-287953 has a narrow angle of view $2\omega$ of about $64°$ in the wide-angle end state, and optical performance is not sufficient, so that it is difficult to realize a compact super wide-angle zoom lens system with high optical performance by extending this technology.

SUMMARY OF THE INVENTION

The present invention is made in view of the aforementioned problems and has an object to provide a super wide-angle zoom lens system having an angle of view of $2\omega=100°$ or more, a zoom ratio about 2, compactness, and high optical performance.

According to one aspect of the present invention, a super wide-angle zoom lens system includes, in order from an object, a first lens group G1 having negative refractive power, and a second lens group G2 having positive refractive power. Zooming is carried out by varying a distance between the first lens group G1 and the second lens group G2. The first lens group G1 has a negative lens component Ln and a positive lens component Lp. The negative lens component Ln has at least one aspherical lens Lasp. The aspherical lens Lasp satisfies the following conditional expressions;

$$2.0 < d\text{max}/d0 < 6.0 \tag{1}$$

$$0.6 < (|R\text{max}| - |R\text{min}|)/|R\text{max}| < 1.0 \tag{2}$$

$$0.5 < d12/ft < 1.5 \tag{3}$$

where d0 denotes the thickness of the aspherical lens Lasp along the optical axis, dmax denotes the thickness of the aspherical lens Lasp at the maximum effective aperture measured parallel to the optical axis, Rmax denotes the radius of curvature of the aspherical lens Lasp on the side having larger absolute value of the paraxial radius of curvature, Rmin denotes the radius of curvature of the aspherical lens Lasp on the side having smaller absolute value of the paraxial radius of curvature, d12 denotes a distance along the optical axis between the most image side surface of the aspherical lens Lasp and the most object side of a lens immediately after the aspherical lens Lasp, and ft denotes the focal length of the zoom lens system in a telephoto end state.

In one preferred embodiment of the present invention, the negative lens component Ln in the first lens group G1 includes at least a first negative lens component La and a second negative lens component Lb. The first negative component La includes the aspherical lens Lasp. The following conditional expression is preferably satisfied;

$$-7.0 < f\text{asp}/fw < -1.0 \tag{4}$$

where fasp denotes the paraxial focal length of the aspherical lens Lasp, and fw denotes the focal length of the zoom lens system in a wide-angle end state.

In one preferred embodiment of the present invention, the second lens group G2 includes, in order from the object, a first positive lens component L21, a second positive lens component L22, a third positive lens component L23, and a negative lens component L24. The negative lens component L24 in the second lens group G2 includes a negative lens element having a concave surface facing to the object.

In one preferred embodiment of the present invention, the negative lens component L24 in the second lens group G2 includes a negative aspherical lens element having a concave surface facing to the object.

In one preferred embodiment of the present invention, the second positive lens component L22 in the second lens group G2 is composed of a cemented lens constructed by, in order from the object, a positive lens element cemented with a negative lens element. The third positive lens component L23 in the second lens group G2 is composed of a cemented lens constructed by, in order from the object, a negative lens element cemented with a positive lens element. In both the second positive lens component L22 and the third positive lens component L23, refractive index at d-line of the cemented negative lens element is higher than that of the cemented positive lens element.

In one preferred embodiment of the present invention, the following conditional expression is preferably satisfied;

$$0.07 < d23/dII < 0.2 \tag{5}$$

where d23 denotes a distance between the second positive lens component L22 and the third positive lens component L23 of the second lens group G2 along the optical axis, and dII denotes the total lens length of the second lens group G2 along the optical axis when the zoom lens is focusing at infinity.

In one preferred embodiment of the present invention, focusing at a close object is carried out by moving only the first positive lens component L21 in the second lens group G2.

DESCRIPTION OF THE PREFERRED EMBODIMENTS

Figure 1:
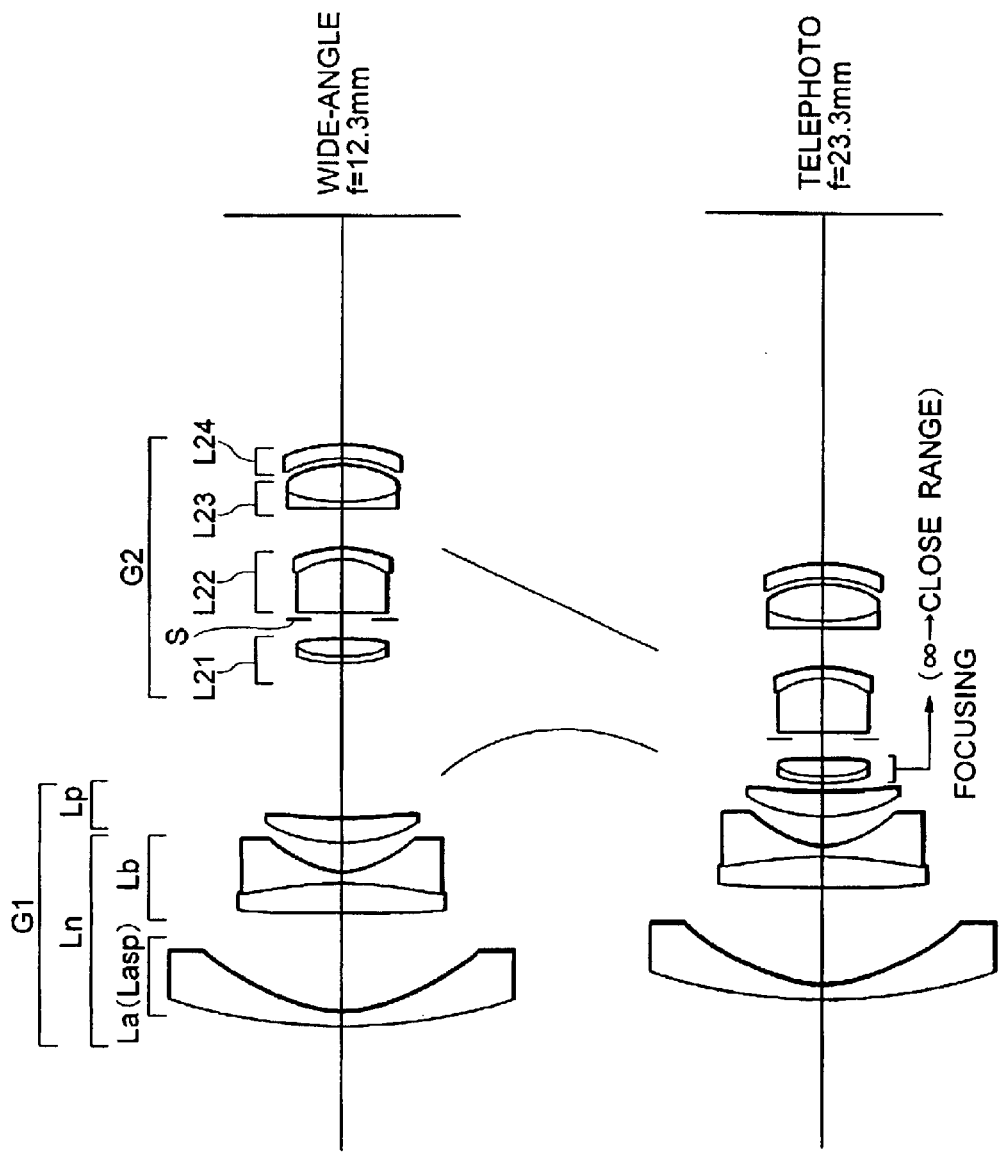
FIG. 1 is a diagram showing the lens arrangement of a super wide-angle zoom lens system according to Example 1 of the present invention together with movement of each lens group.

Embodiments of the present invention are going to be explained below. A super wide-angle zoom lens system according to the present invention includes two lens groups composed of, in order from an object, a first lens group G1 having negative refractive power and a second lens group G2 having positive refractive power. The first lens group G1 includes, in order from the object, a negative lens component Ln and a positive lens component Lp. The negative lens component Ln has at least one aspherical lens Lasp. In the embodiment, the negative lens component Ln is composed of a first negative lens component La which is a negative meniscus lens having a convex surface facing to the object and a second negative lens component Lb which is a composite type aspherical lens made of glass and resin. The first negative lens component La has a negative meniscus aspherical lens Lasp having aspherical surfaces on both sides. The first lens group G1 is further composed of a positive lens component Lp which is a positive meniscus lens having a convex surface facing to the object.

The second lens group G2 is composed of, in order from the object, a first positive lens component L21 that is moved independently upon focusing, and has a cemented positive lens constructed by a negative meniscus lens cemented with a double convex positive lens, an aperture stop S, a second positive lens component L22 that has a cemented positive lens constructed by a positive lens cemented with a negative meniscus lens, a third positive lens component L23 that has a cemented positive lens constructed by a negative lens cemented with a double convex positive lens, and a negative lens component L24 that has a negative meniscus aspherical lens having a concave surface facing to the object and aspherical surfaces on both sides.

The present invention satisfies the following conditional expressions;

$$2.0 < dmax/d0 < 6.0 \quad (1)$$

$$0.6 < (|Rmax| - |Rmin|)/|Rmax| < 1.0 \quad (2)$$

$$0.5 < d12/ft < 1.5 \quad (3)$$

$$-7.0 < fasp/fw < -1.0 \quad (4)$$

$$0.07 < d23/dII < 0.2 \quad (5)$$

where d0 denotes the thickness of the aspherical lens Lasp along the optical axis, dmax denotes the thickness of the aspherical lens Lasp at the maximum effective aperture Φ measured parallel to the optical axis, Rmax denotes the radius of curvature of the aspherical lens Lasp on the side having larger absolute value of the paraxial radius of curvature, Rmin denotes the radius of curvature of the aspherical lens Lasp on the side having smaller absolute value of the paraxial radius of curvature, d12 denotes a distance along the optical axis between the most image side surface of the aspherical lens Lasp and the most object side of a lens immediately after the aspherical lens Lasp, ft denotes the focal length of the zoom lens system in a telephoto end state, fasp denotes the paraxial focal length of the aspherical lens Lasp, fw denotes the focal length of the zoom lens system in a wide angle end state, d23 denotes a distance between the second positive lens component L22 and the third positive lens component L23 of the second lens group G2 along the optical axis, and dII denotes the total lens length of the second lens group G2 when the zoom lens is focusing at infinity.

The present invention provides a super wide-angle zoom lens system having an angle of view of 2ω=100° or more in an wide-angle end state, a small number of lens elements, good aberration correction, and sufficient amount of peripheral quantity of light.

The primary characteristic of the present invention is to realize an aspherical surface design method that enables glass molding to manufacture easily a large diameter aspherical lens which has been difficult to be manufactured and improves optical performance.

In aspherical surface manufacturing methods, roughly four kinds have been known so far. A large diameter aspherical lens having a conspicuous concave aspherical surface is difficult to be manufactured by a cutting (precision cutting and polishing) method.

In glass molding, there has been a restriction on the tangent angle of a concave surface at maximum internal diameter. However, glass molding has merits such as productivity, manufacturing cost, and shape accuracy. Moreover, by overcoming several optical designing restrictions, glass molding enables to manufacture various kinds of aspherical lenses, so that it is also a merit that various kinds of aspherical lenses suitable for correcting aberrations can be molded.

On the other hand, it is most difficult problem to improve optical performance on the periphery of the image when a super wide-angle zoom lens system is to be designed. The most important problems are such as correction of astigmatism and curvature of field caused by control of Petzval sum, correction of increased coma caused by securing peripheral quantity of light, correction of lateral chromatic aberration, and control of distortion. In order to effectively correct these aberrations, refractive power of each lens group should be arranged the most suitably and the thickness of the first lens group G1 having negative refractive power should be made thicker. However, when ordinary design method as described above is used, the diameter of the lens barrel as well as the lens itself becomes large. Moreover, when an aspherical surface is introduced carelessly, the design solution often results in that having lack of productivity. Accordingly, the present invention has found a design solution giving an aspherical shape suitable for glass molding with preferably correcting coma, astigmatism, curvature of field, distortion, and the like.

In the aspherical shape, by arranging strong negative refractive power on the central area, Petzval sum is optimized and variable distance (dead space) for zooming is secured. By forming the shape that the curvature becomes extremely small from middle area to the periphery of the aspherical surface, an oblique ray refracts weaker than central area, so that lower coma, distortion, and the like are not deteriorated. As a result, the difference in lens thickness between the central area and the peripheral area of the aspherical lens makes it possible to provide the optimum aspherical shape in view of correction of aberrations as well as lens production.

Each conditional expression to be satisfied by a super wide-angle zoom lens system according to the present invention is explained below.

Conditional expression (1) defines an appropriate range for setting the difference in lens thickness between the central area and the peripheral area of the aspherical lens Lasp. By making good use of various parameter of the aspherical coefficients, this conditional expression makes it possible to coexist increase in optical performance and productivity. In glass molding, aspherical surface accuracy increases when the difference in the lens thickness between the central area and peripheral area is small.

On the other hand, when the difference in the lens thickness between the central area and the peripheral of a meniscus lens becomes more than several tens of times, mass production of the lens becomes extremely difficult. When the tangent angle (the angle between a plane normal to the optical axis and the tangent plane at the maximum internal diameter) on the concave surface exceeds 50°, the surface cannot be formed with high precision. Moreover, when further increasing the tangent angle on the concave surface side to approach a hemisphere, forming an aspherical lens by means of glass molding cannot be possible.

Furthermore, when the paraxial radius of curvature of one surface bears close resemblance to that of the other surface, transmissive decentering accuracy of the aspherical lens Lasp cannot be secured, so that it is necessary to secure optimum difference in radius of curvature and lens thickness.

When the ratio dmax/d0 exceeds the upper limit of conditional expression (1), the thickness of the aspherical lens Lasp becomes excessively thick on the peripheral area, so that it becomes difficult to manufacture with low cost. Moreover, in aberration correction, local correction balance loses and distortion, astigmatism, and lower coma become worse.

When the upper limit of conditional expression (1) is set to 5.5, manufacturing difficulty of the aspherical lens Lasp is alleviated. When the upper limit of conditional expression (1) is set to 5.0, even better optical performance of the present invention can be expected.

When the ratio dmax/d0 falls below the lower limit of conditional expression (1), the radius of curvature on the peripheral area of the aspherical lens Lasp becomes excessively small, so that the sign of refractive power on the central area changes on the peripheral area (a first case) or the refractive power on the central area of the aspherical lens Lasp becomes excessively small (a second case). In the first case, variation in aberration on the peripheral area of the aspherical lens Lasp becomes extremely large, so that it causes deterioration of optical performance of the zoom lens. In the second case, paraxial refractive power of the aspherical lens Lasp becomes weak and the function as a negative lens goes down, so that Petzval sum cannot be properly set. Moreover, since another lens having negative refractive power becomes necessary as a substitute, the number of lens elements increases and the zoom lens becomes large, so that it is not preferable.

When the lower limit of conditional expression (1) is set to 3.1, better aberration correction can be obtained. When the lower limit of conditional expression (1) is set to 3.4, even better optical performance of the present invention can be expected.

When the aspherical lens Lasp is a cemented lens, the conditional expression is calculated with the thickness of each lens element because each lens element is manufactured separately. On the other hand, when the aspherical lens Lasp is a compound type aspherical lens made of glass and resin, the conditional expression is calculated with the total thickness of glass and resin because they are not manufactured separately.

Moreover, when a plurality of aspherical lenses exist in the negative lens component Ln of the first lens group G1, at least one aspherical lens may satisfy conditional expression (1). In view of compactness and aberration correction of the zoom lens, it is desirable that the most object side aspherical lens among the plurality of aspherical lenses satisfies conditional expression (1).

Furthermore, in order to obtain the best optical performance of the present invention, it is desirable that at least one second aspherical lens other than the aspherical lens Lasp is arranged so that correction of off-axis aberrations such as lower coma and spherical aberration can be compensated. In consideration of productivity, it is preferable that the second aspherical lens is an aspherical lens made by glass molding or a compound type aspherical lens made of glass and resin.

Conditional expression (2) defines an appropriate range of the paraxial radius of curvature of the aspherical lens Lasp. When the aspherical surface is expressed by the aspherical expression described later, paraxial values such as focal length includes not only reference radius of curvature r but also C2 of the second order aspherical coefficient.

When the ratio (|Rmax|−|Rmin|)/|Rmax| exceeds the upper limit of conditional expression (2), difference in radius of curvature of the central area of the aspherical lens Lasp becomes large. Negative paraxial refractive power of the aspherical lens Lasp becomes excessively strong, so that in order to keep the aspherical shape defined in the scope of conditional expression (1), local variation in the aspherical curve becomes large. Accordingly, aforementioned aberrations become worse, so that it is not desirable.

When the upper limit of conditional expression (2) is set to 0.9, better aberration correction can be obtained. When the upper limit of conditional expression (2) is set to 0.85, even better optical performance of the present invention can be expected.

When the ratio $(|Rmax|-|Rmin|)/|Rmax|$ falls below the lower limit of conditional expression (2), it becomes difficult to suitably set Petzval sum and to secure a variable distance (dead space) for zooming. In a super wide-angle zoom lens system according to the present invention, in order to suitably set Petzval sum and to secure sufficient variable distance (dead space) for zooming, it is necessary that each negative element has sufficient negative refractive power. When the ratio falls below the lower limit of conditional expression (2), the number of lens elements constructing the zoom lens becomes large and the whole lens system becomes large, so it is undesirable.

When the lower limit of conditional expression (2) is set to 0.65, better aberration correction can be obtained. When the lower limit of conditional expression (2) is set to 0.68, even better optical performance of the present invention can be expected.

Conditional expression (3) defines an appropriate range of a distance between the aspherical lens Lasp and a lens immediately after the aspherical lens Lasp. When this conditional expression is satisfied together with conditional expressions (1) and (2), the optimum correction of aberration for a super wide-angle zoom lens system according to the present invention becomes possible.

When the ratio d12/ft exceeds the upper limit of conditional expression (3), the distance between the aspherical lens Lasp and the lens to the object side of the aspherical lens Lasp becomes excessively wide. As a result, the first lens group G1 having negative refractive power becomes excessively thick, the aspherical lens Lasp becomes large, and manufacturing cost also excessively increases, so that it is undesirable.

When the ratio d12/ft falls below the lower limit of conditional expression (3), the distance between the aspherical lens Lasp and the lens to the object side of the aspherical lens Lasp becomes narrow. As a result, the first lens group G1 having negative refractive power becomes extremely thin, and refractive power of each lens element becomes strong. Accordingly, refractive power of the aspherical lens Lasp becomes strong, and variation in aspherical surface to each incident height increases. Therefore, even if conditional expressions (1) and (2) are both satisfied, aberration correction loses balance in consequence, so that good optical performance cannot obtained. In order to keep good aberration correction, when the number of lens element increases, the total lens size becomes large and manufacturing cost increases, so that it is undesirable.

When the lower limit of conditional expression (3) is set to 0.6 or more, better aberration correction can be obtained. When the lower limit of conditional expression (3) is set to 0.63 or more, even better optical performance of the present invention can be expected.

Conditional expression (4) defines an appropriate range of refractive power of the aspherical lens Lasp. When the ratio fasp/fw exceeds the upper limit of conditional expression (4), negative refractive power of the aspherical lens Lasp becomes extremely strong, so that even if conditional expression (1) is satisfied, difference in radius of curvature in the central area becomes large. Moreover, negative paraxial refractive power of the aspherical lens Lasp becomes extremely large, so that in order to keep the aspherical shape defined in the scope of conditional expression (1), local variation in the aspherical curve becomes large. Accordingly, aforementioned aberrations become worse, so that it is not desirable.

On the other hand, when the ratio fasp/fw falls below the lower limit of conditional expression (4), negative refractive power of the aspherical lens Lasp becomes extremely small, and it becomes difficult to suitably set Petzval sum and to secure a variable distance (dead space) for zooming. In a super wide-angle zoom lens system according to the present invention, in order to suitably set Petzval sum and to secure sufficient variable distance (dead space) for zooming, it is necessary that each negative element has sufficient negative refractive power. Moreover, when the ratio fasp/fw falls below the lower limit of conditional expression (4), the number of lens elements constructing the zoom lens becomes large and the whole lens system becomes large, so it is undesirable.

The secondary characteristic of the present invention that is to reduce the number of lens elements and to increase optical performance of a super wide-angle zoom lens system is explained. In a negative lens group leading wide-angle zoom lens, a negative-positive two-lens group zoom lens is a typical low-priced compact zoom lens. The second lens group G2 of this zoom lens is only one lens group working as the master lens having positive refractive power. The present invention proposes the construction of the second lens group G2 having new positive refractive power as the second characteristic in addition to the first characteristic regarding the aforementioned aspherical lens.

Usually, the second lens group that is the master lens group of the two-lens group zoom lens often uses a modified triplet type lens constructed by a positive lens element, a positive lens element, a negative lens element, and a positive lens element such as a Tele-Sonnar type, and an Ernoster type. However, in this lens construction, aberration produced by positive lens elements is born on the only one negative lens element, so that there is a limit to reducing total remnant aberration. Since aberrations are cancelled by combining surfaces each producing large amount of aberration, decentering tolerance is small, so it is unsuited to produce a high optical performance zoom lens on a commercial base.

The present invention proposes a new lens type that minimizes aberration produced by each lens component, secures sufficient lens thickness, and is composed of a positive lens component L21, a positive lens component L22, a positive lens component L23, and a negative lens component L24.

This lens type makes it possible to minimize the remnant aberration of each lens component, allow large decentering tolerance, and keep high optical performance even in producing on a commercial base. In order to preferably correct upper coma and spherical aberration, an aspherical surface is preferably set on the negative lens component L24 among four lens components of the positive lens component L21, the positive lens component L22, the positive lens component L23, and the negative lens component L24. Moreover, it is desirable that the aspherical lens is arranged to the most image side of the zoom lens, so that by centering (centering adjustment) the aspherical lens through the whole lens system upon assembling, optical performance can easily be improved. Moreover, it is preferable that the middle two lens components, the positive lens component L22 and the positive lens component L23, of the four lens components of the positive lens component L21, the positive lens component L22, the positive lens component L23, and the negative lens component L24 are both cemented lenses each constructed by a positive-negative or negative-positive cemented lens. This is for achieving high optical performance by reducing remnant aberration by means of minimizing aberration produced by each lens component, and securing sufficient lens thickness. In these cemented lenses, it is desirable that refractive index of negative lens element is higher than that of positive lens element because the remnant aberration of each lens component can be small.

Conditional expression (5) defines an appropriate range of the distance between the two positive lens components L22 and L23 located middle of the aforementioned four lens components, the positive lens component L21, the positive lens component L22, the positive lens component L23, and the negative lens component L24.

When the ratio d23/dII exceeds the upper limit of conditional expression (5), the distance between the positive lens component L22 and the positive lens component L23 becomes extremely large, so that it is undesirable that the whole lens system becomes large resulting in a decrease in peripheral quantity of light.

On the other hand, when the ratio d23/dII falls below the lower limit of conditional expression (5), the separation between the two positive lens components (L22 and L23) becomes small, lens thickness of the second lens group G2 tends to be thin, refractive power of each lens component becomes strong, and the remnant aberration of each lens component tends to increase, so that it is undesirable.

When the lower limit of conditional expression (5) is set to 0.09 or more, even better optical performance of the present invention can be expected.

In the present invention, it is desirable that focusing is carried out with an internal focusing method performed by only the positive lens component L21 locating to the most object side of the second lens group G2.

Since each positive lens component in the second lens group G2 (L21, L22, and L23) is carried out aberration correction and chromatic correction within each component as good as possible, by shifting any one of these positive lens component relative to the optical axis, the zoom lens can be used as a so-called vibration reduction lens.

Moreover, a zoom lens system according to the present invention can be applied to a lens system having a perspective control system such as the PC Nikkor 28 mm f/3.5 (a product of Nikon Corporation)

Numerical examples according to the present invention is explained blow with reference to accompanying drawings.

EXAMPLE 1

FIG. 1 is a diagram showing the lens arrangement of a super wide-angle zoom lens system according to Example 1 of the present invention together with movement of each lens group. The zoom lens according to Example 1 is composed of, in order from an object, a first lens group G1 having negative refractive power and a second lens group G2 having positive refractive power. The first lens group G1 is composed of, in order from the object, a negative lens component Ln and a positive lens component Lp. The negative lens component Ln is composed of a first negative lens component La (corresponding to Lasp) that is a negative meniscus double aspherical lens having a convex surface facing to the object and a second negative component Lb that is a cemented lens constructed by a double convex positive lens cemented with a double concave negative lens and is a composite aspherical lens made of glass and resin locating on the most image side. The positive lens component Lp is composed of a positive meniscus lens having a convex surface facing to the object.

The second lens group G2 is composed of, in order from the object, a first positive lens component L21 that is moved independently upon focusing at a close object and has a cemented positive lens constructed by a negative meniscus lens cemented with a double convex positive lens, an aperture stop S, a second positive lens component L22 that has a cemented positive lens constructed by a positive meniscus lens cemented with a negative meniscus lens, a third positive lens component L23 that has a cemented positive lens constructed by a negative meniscus lens cemented with a double convex positive lens, and a negative lens component L24 that has a negative meniscus aspherical lens having a concave surface facing to the object and aspherical surfaces on both sides.

Various values according to Example 1 are shown in Table 1. In Table 1, the surface number is a lens surface counted in order from the object, r denotes the radius of curvature of a lens surface, an aspherical surface is denoted by an asterisk (*) and a paraxial radius of curvature is shown in r-column. Moreover, d denotes a surface distance of a lens surface R along the optical axis, N(d) denote refractive index of a medium at d-line, and ν denotes Abbe number of the medium.

An aspherical surface is expressed by the following expression;

$$X(y)=(y^2/r)/[1+(1-\kappa \cdot (y^2/r^2))^{1/2}]+C3|y|^3+\Sigma Ci \cdot y^i (i=2, 4, 6, 8, 10, 12, 14)$$

$$R-1/[(1/r)+2 \cdot C2]$$

where y denotes a height from the optical axis, X denotes sag amount, R denotes a paraxial radius of curvature, r denotes reference radius of curvature, κ denotes a conical coefficient, and C2, C3, Ci denote $2^{nd}$ order, $3^{rd}$ order, i-th order aspherical coefficient, respectively. "E-05" denotes "$10^{-05}$". Reference symbol f denotes the focal length, β denotes a magnification, D0 denotes the distance from the object to the most object side lens surface, FNO denotes the f-number, 2ω denotes an angle of view (unit: degree).

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used. The explanation of reference symbols is the same in the other example.

TABLE 1 f = 12.3 – 23.3 mm
2ω = 102.4 – 64.9°
FNO = 4.1

| Surface Number | r | d | ν | N (d) |
|---|---|---|---|---|
| 1)* | 78.0922 | 2.0000 | 49.55 | 1.744429 |
| 2)* | 19.6266 | 16.6500 | | |
| 3) | 242.6225 | 5.0000 | 40.75 | 1.581440 |
| 4) | −65.8923 | 1.5000 | 49.61 | 1.772500 |
| 5) | 16.1000 | 0.1000 | 38.09 | 1.553890 |
| 6)* | 16.2260 | 4.8000 | | |
| 7) | 23.3293 | 4.0000 | 27.51 | 1.755200 |
| 8) | 93.0176 | D8 | | |
| 9) | 30.6806 | 0.9000 | 52.67 | 1.741000 |
| 10) | 16.8907 | 3.0000 | 45.79 | 1.548140 |
| 11) | −82.9562 | D11 | | |
| 12> | Aperture Stop | 1.0000 | | |
| 13) | −4845.7452 | 9.0000 | 82.52 | 1.497820 |
| 14) | −11.9598 | 1.3500 | 46.58 | 1.804000 |
| 15) | −24.9515 | 6.9500 | | |
| 16) | 774.8986 | 0.9000 | 39.59 | 1.804400 |
| 17) | 20.0882 | 6.5000 | 82.52 | 1.497820 |
| 18) | −15.3138 | 1.0000 | | |
| 19)* | −19.8294 | 2.0000 | 57.44 | 1.606020 |
| 20)* | −23.8261 | BF | | |

TABLE 1-continued f = 12.3 – 23.3 mm
2ω = 102.4 – 64.9°
FNO = 4.1

(Aspherical Data)
Surface Number 1

κ = –13.9624
C2 = 0.00000E+00
C3 = 0.00000E+00
C4 = 7.03860E–07
C6 = 1.23420E–10
C8 = 2.35070E–13
C10 = 4.78750E–16
C12 = 0.13662E–18
C14 = 0.00000E+00
Surface Number 2

κ = –0.6055
C2 = 0.00000E+00
C3 = 0.26968E–04
C4 = –4.77700E–06
C6 = –3.12450E–09
C8 = 1.23680E–12
C10 = 3.39710E–15
C12 = 0.16057E–16
C14 = 0.41171E–20
Surface Number 6

κ = 0.3414
C2 = 0.00000E+00
C3 = 0.25582E–04
C4 = 3.67940E–05
C6 = –6.97010E–08
C8 = 7.16180E–10
C10 = –3.18200E–12
C12 = 0.19011E–16
C14 = 0.32012E–17
Surface Number 19

κ = 1.4732
C2 = 0.00000E+00
C3 = 0.37935E–05
C4 = –3.87640E–06
C6 = –6.02020E–08
C8 = –9.02410E–10
C10 = –1.90620E–12
C12 = 0.00000E+00
C14 = 0.00000E+00
Surface Number 20

κ = 0.6403
C2 = 0.00000E+00
C3 = –0.81158E–06
C4 = –1.91950E–06
C6 = –7.62310E–08
C8 = –3.70540E–10
C10 = –4.03920E–12
C12 = 0.00000E+00
C14 = 0.00000E+00

(Variable intervals)

|    | 1-POS    | 2-POS    | 3-POS    |
|----|----------|----------|----------|
| f  | 12.30000 | 18.00000 | 23.30000 |
| D0 | ∞        | ∞        | ∞        |
| D8 | 25.95663 | 9.88203  | 1.99178  |
| D11| 3.43377  | 3.43377  | 3.43377  |
| BF | 37.99664 | 48.43207 | 58.13521 |

|    | 4-POS    | 5-POS    | 6-POS    |
|----|----------|----------|----------|
| β  | –0.02500 | –0.02500 | –0.02500 |
| D0 | 459.2617 | 689.4384 | 902.4793 |
| D8 | 26.70744 | 10.35626 | 2.37102  |
| D11| 2.68296  | 2.95954  | 3.05453  |
| BF | 38.00021 | 48.43563 | 58.13876 |

TABLE 1-continued f = 12.3 – 23.3 mm
2ω = 102.4 – 64.9°
FNO = 4.1

|    | 7-POS    | 8-POS    | 9-POS    |
|----|----------|----------|----------|
| β  | –0.07149 | –0.11266 | –0.14164 |
| D0 | 139.2930 | 134.8576 | 140.6163 |
| D8 | 28.12092 | 12.01643 | 4.12618  |
| D11| 1.26948  | 1.29937  | 1.29937  |
| BF | 38.02654 | 48.43207 | 58.13521 |

(Values for the conditional expressions)

(1) dmax/d0 = 4.49 (where φ = 43.65 mm)
(2) (|Rmax| – |Rmin|)/|Rmax| = 0.749
(3) d12/ft = 0.715
(4) fasp/fw = –2.91
(5) d23/dII = 0.119 where Φ denotes the maximum effective aperture.

Figure 2:
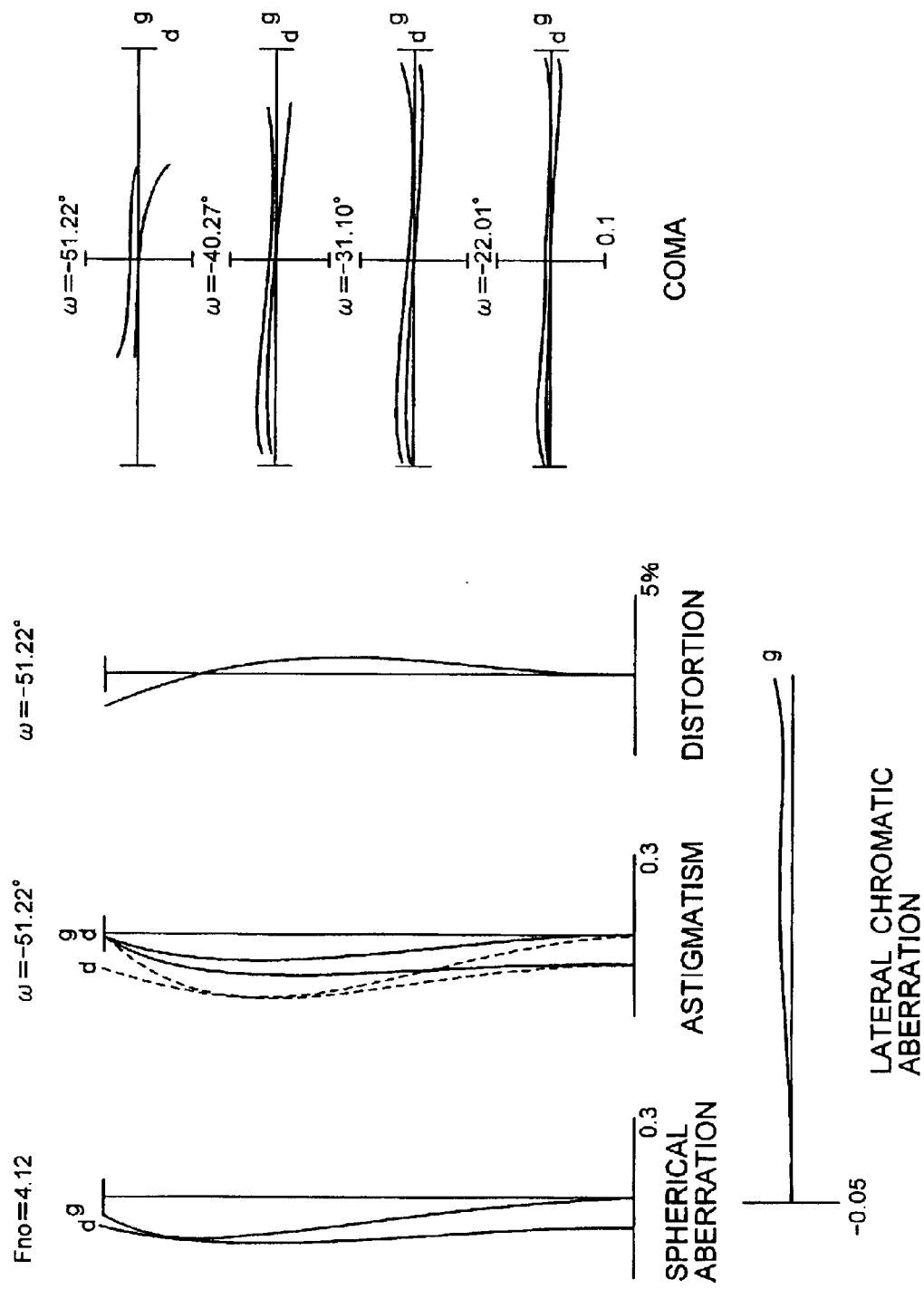
FIG. 2 graphically shows various aberrations of the super wide-angle zoom lens system according to Example 1 in a wide-angle end state when the zoom lens is focused at infinity.
Figure 3:
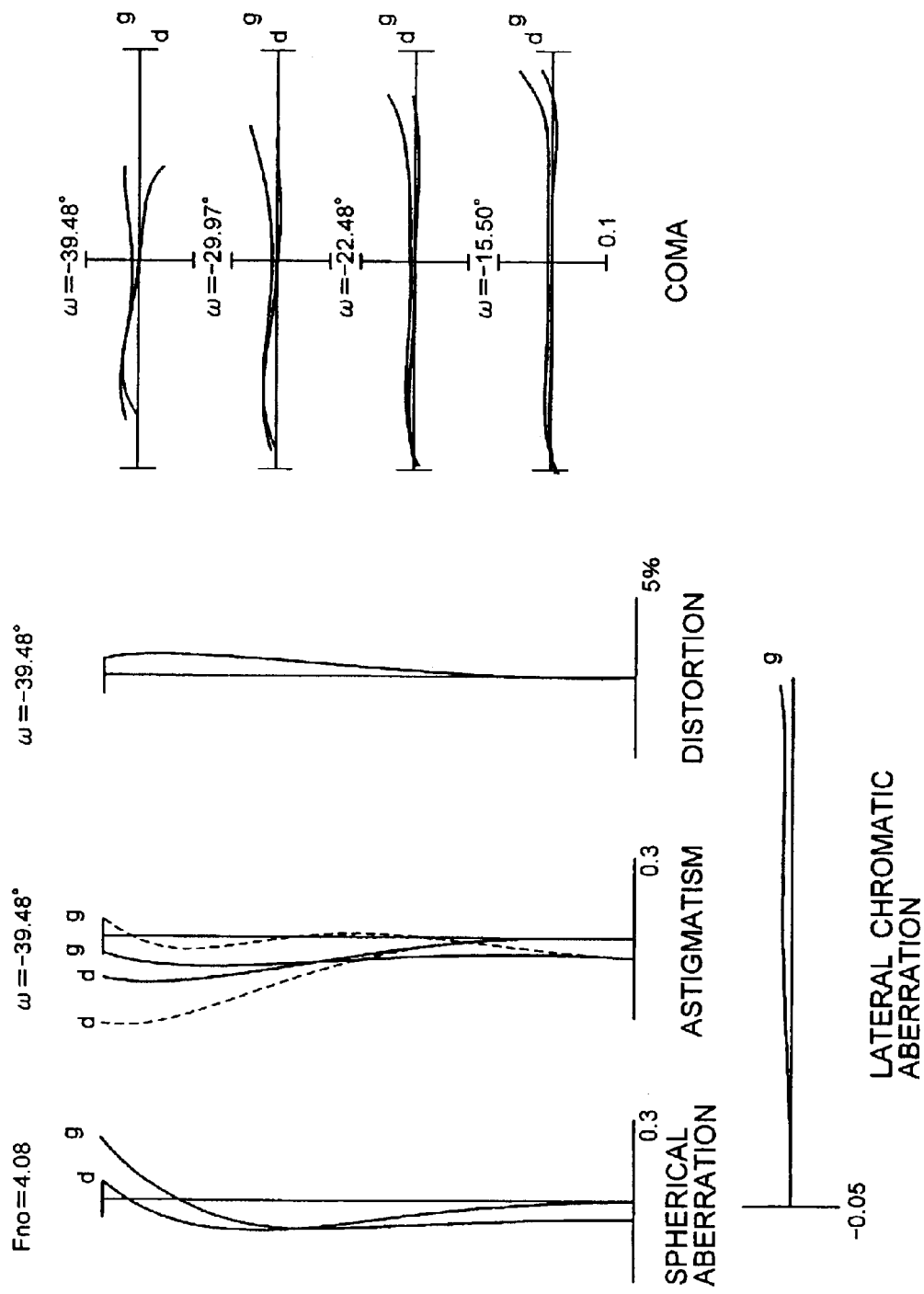
FIG. 3 graphically shows various aberrations of the super wide-angle zoom lens system according to Example 1 in an intermediate focal length state when the zoom lens is focused at infinity.
Figure 4:
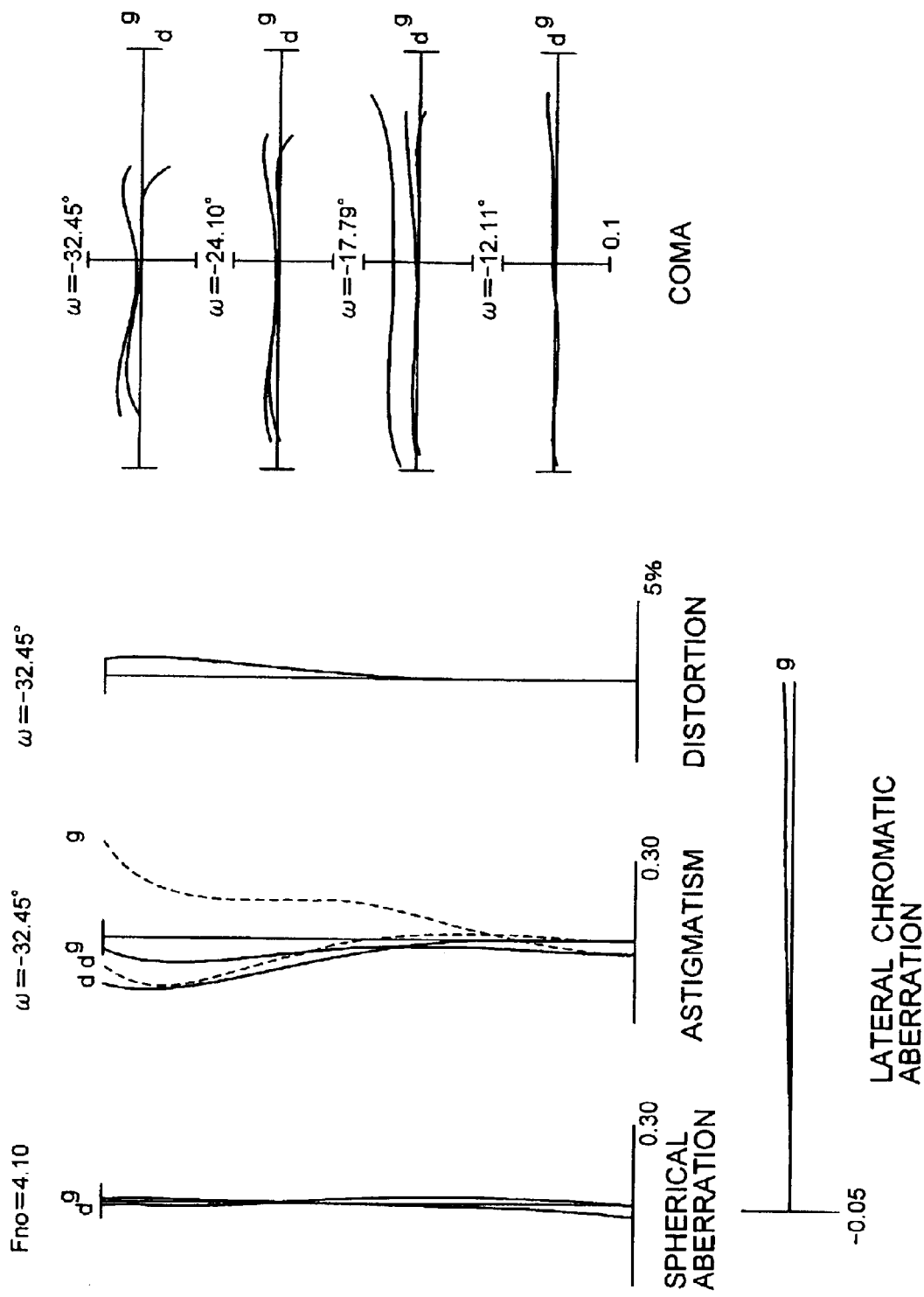
FIG. 4 graphically shows various aberrations of the super wide-angle zoom lens system according to Example 1 in a telephoto end state when the zoom lens is focused at infinity.

FIG. 2 graphically shows various aberrations of the super wide-angle zoom lens system according to Example 1 in a wide-angle end state when the zoom lens is focused at infinity. As is apparent from the graphs, sufficient amount of peripheral quantity of light is secured and excellent compensation is made for the various aberrations. FIG. 3 graphically shows various aberrations of the super wide-angle zoom lens system according to Example 1 in an intermediate focal length state when the zoom lens is focused at infinity. As is apparent from the graphs, excellent compensation is made for the various aberrations. FIG. 4 graphically shows various aberrations of the super wide-angle zoom lens system according to Example 1 in a telephoto end state when the zoom lens is focused at infinity. As is apparent from the graphs, excellent compensation is made for the various aberrations.

In respective graphs, d denotes d-line, g denotes g-line, C denotes C-line, F denotes F-line, FNO denotes the f-number, and ω denotes a half angle of view. In the graph showing spherical aberration, f-number shows the value at the maximum aperture. In the graphs showing astigmatism or distortion, the maximum value of a half angle of view ω is shown. In the graphs showing coma, each half angle of view ω is shown.

In the graph showing astigmatism, a solid line indicates a sagittal image plane and a broken line indicates a meridional plane. The above-described explanation regarding various aberration graphs is the same as the other example.

EXAMPLE 2

Figure 5:
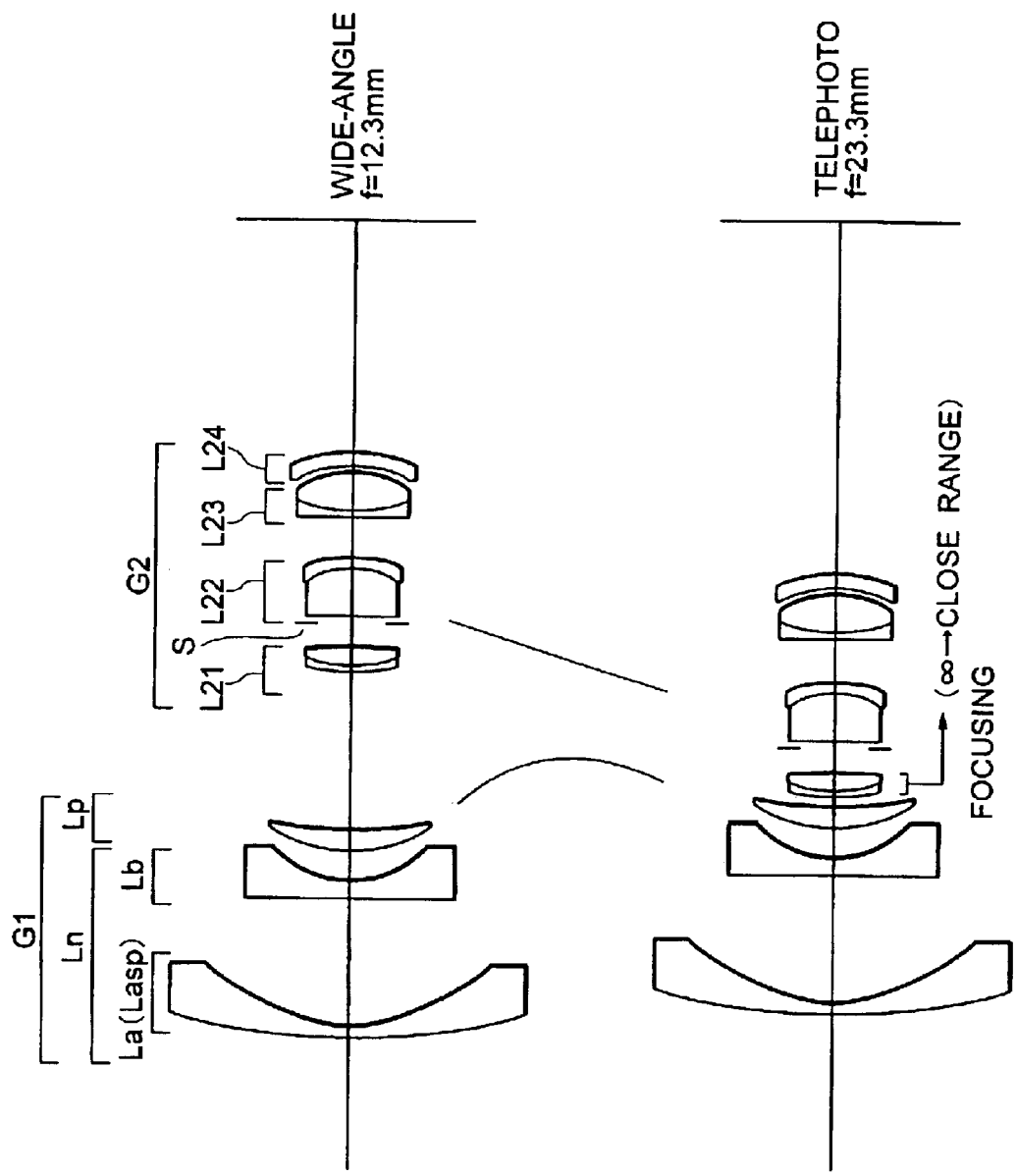
FIG. 5 is a diagram showing the lens arrangement of a super wide-angle zoom lens system according to Example 2 of the present invention together with movement of each lens group.

FIG. 5 is a diagram showing the lens arrangement of a super wide-angle zoom lens system according to Example 2 of the present invention together with movement of each lens group. The zoom lens according to Example 2 is composed of, in order from an object, a first lens group G1 having negative refractive power and a second lens group G2 having positive refractive power. The first lens group G1 is composed of, in order from the object, a negative lens component Ln and a positive lens component Lp. The negative lens component Ln is composed of, in order from the object, a first negative lens component La (corresponding to Lasp) that is a negative meniscus double aspherical lens having a convex surface facing to the object and a second negative component Lb that is a composite aspherical lens made of glass and resin locating on the image side. The positive lens component Lp is composed of a positive meniscus lens having a convex surface facing to the object.

The second lens group G2 is composed of, in order from the object, a first positive lens component L21 that is moved independently upon focusing at a close object and has a cemented positive lens constructed by a negative meniscus lens cemented with a double convex positive lens, an aperture stop S, a second positive lens component L22 that has a cemented positive lens constructed by a double convex positive lens cemented with a negative meniscus lens, a third positive lens component L23 that has a cemented positive lens constructed by a double concave negative lens cemented with a double convex positive lens, and a negative lens component L24 that has a negative meniscus aspherical lens having a concave surface facing to the object and aspherical surfaces on both sides.

Various values according to Example 2 are shown in Table 2.

TABLE 2 f = 12.3 – 23.3 mm
2ω = 102.4 – 64.9°
FNO = 4.1

| Surface Number | r | d | ν | N (d) |
|---|---|---|---|---|
| 1)* | 76.5095 | 2.0000 | 45.37 | 1.796681 |
| 2)* | 20.5343 | 20.2585 | | |
| 3) | 261.4011 | 3.0000 | 49.61 | 1.772500 |
| 4) | 15.8000 | 0.0500 | 38.09 | 1.553890 |
| 5)* | 16.0268 | 4.9882 | | |
| 6) | 22.9409 | 3.3000 | 23.78 | 1.846660 |
| 7) | 58.3864 | D7 | | |
| 8) | 29.7686 | 0.9000 | 52.67 | 1.741000 |
| 9) | 16.7303 | 3.0000 | 48.87 | 1.531720 |
| 10) | −76.4720 | D10 | | |
| 11> | Aperture Stop | 1.0000 | | |
| 12) | 677.7510 | 8.0000 | 82.52 | 1.497820 |
| 13) | −11.8688 | 1.5000 | 47.38 | 1.788000 |
| 14) | −25.6331 | 6.8941 | | |
| 15) | −5796.0216 | 1.0000 | 39.59 | 1.804400 |
| 16) | 19.2038 | 6.5000 | 82.52 | 1.497820 |
| 17) | −15.1366 | 1.0000 | | |
| 18)* | −20.0829 | 2.0000 | 57.44 | 1.606020 |
| 19)* | −23.3369 | BF | | |

(Aspherical Data)
Surface Number 1

κ = −17.5102
C2 = 0.00000E+00
C3 = 0.00000E+00
C4 = 6.56300E−08
C6 = −2.13770E−10
C8 = 9.86030E−14
C10 = 3.84890E−16
C12 = 0.16148E−19
C14 = 0.00000E+00
Surface Number 2

κ = −0.6853
C2 = 0.00000E+00
C3 = −0.41253E−05
C4 = −4.77700E−06
C6 = −2.64970E−09
C8 = 1.21240E−12
C10 = 2.61730E−15
C12 = 0.61642E−17
C14 = 0.00000E+00
Surface Number 5

κ = 0.3579
C2 = 0.00000E+00
C3 = 0.22052E−04
C4 = 3.76900E−05
C6 = −7.28030E−08
C8 = 7.45140E−10

TABLE 2-continued f = 12.3 – 23.3 mm
2ω = 102.4 – 64.9°
FNO = 4.1

C10 = −2.91520E−12
C12 = −0.63454E−15
C14 = 0.00000E+00
Surface Number 18

κ = 1.4637
C2 = 0.00000E+00
C3 = 0.13456E−05
C4 = −3.79410E−06
C6 = −5.25180E−08
C8 = −9.54110E−10
C10 = −5.97710E−12
C12 = 0.00000E+00
C14 = 0.00000E+00
Surface Number 19

κ = 0.6296
C2 = 0.00000E+00
C3 = 0.00000E+00
C4 = −1.70450E−06
C6 = −8.61250E−08
C8 = −5.15940E−10
C10 = −4.88550E−12
C12 = 0.00000E+00
C14 = 0.00000E+00

(Variable intervals)

| | 1-POS | 2-POS | 3-POS |
|---|---|---|---|
| f | 12.30000 | 18.00000 | 23.30000 |
| D0 | ∞ | ∞ | ∞ |
| D7 | 25.96779 | 9.89319 | 2.00294 |
| D10 | 3.84764 | 3.84764 | 3.84764 |
| BF | 37.99999 | 48.43542 | 58.13856 |

| | 4-POS | 5-POS | 6-POS |
|---|---|---|---|
| β | −0.02500 | −0.02500 | −0.02500 |
| D0 | 458.8438 | 689.0205 | 902.0613 |
| D7 | 26.71860 | 10.36742 | 2.38218 |
| D10 | 3.09683 | 3.37341 | 3.46840 |
| BF | 38.00359 | 48.43902 | 58.14215 |

| | 7-POS | 8-POS | 9-POS |
|---|---|---|---|
| β | −0.06056 | −0.09657 | −0.12130 |
| D0 | 169.9220 | 155.4110 | 162.1356 |
| D7 | 27.79779 | 11.72319 | 3.83294 |
| D10 | 2.01764 | 2.01764 | 2.01764 |
| BF | 38.02153 | 48.49037 | 58.22520 |

(Values for the conditional expressions)

(1) dmax/d0 = 4.34 (where φ = 45.48 mm)
(2) (|Rmax| − |Rmin|)/|Rmax| = 0.732
(3) d12/ft = 0.869
(4) fasp/fw = −2.91
(5) d23/dII = 0.119 where Φ denotes the maximum effective aperture.

Figure 6:
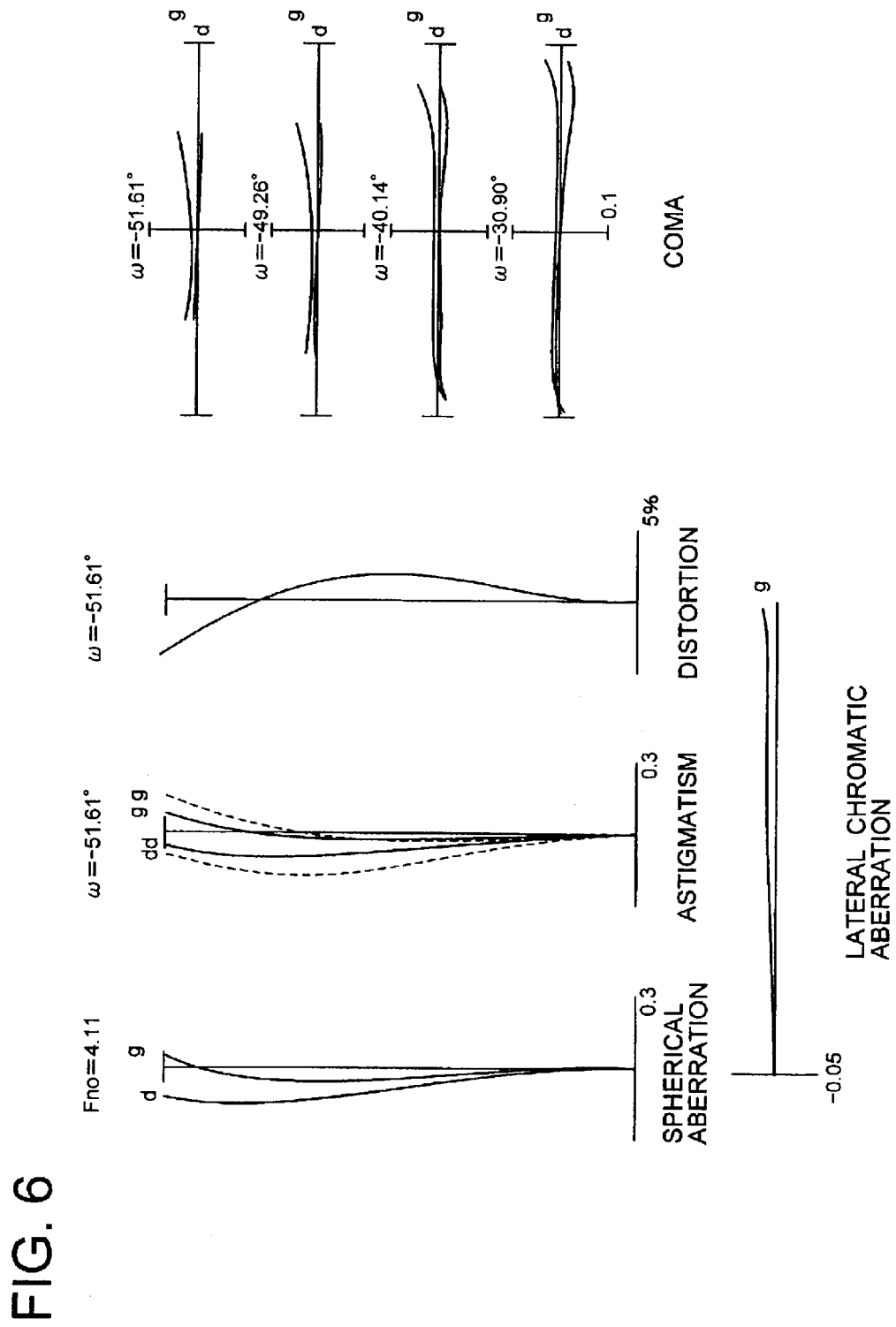
FIG. 6 graphically shows various aberrations of the super wide-angle zoom lens system according to Example 2 in a wide-angle end state when the zoom lens is focused at infinity.
Figure 7:
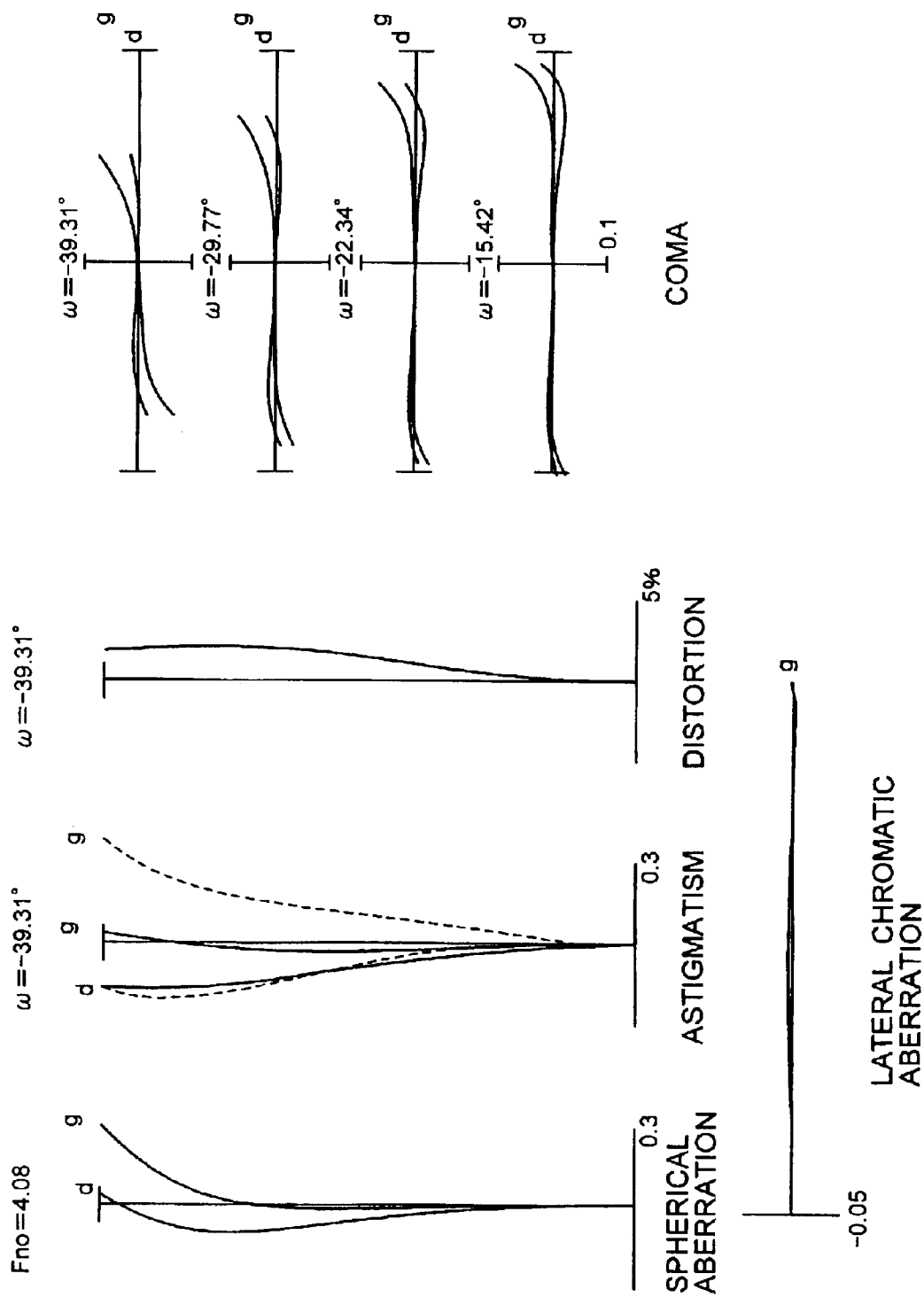
FIG. 7 graphically shows various aberrations of the super wide-angle zoom lens system according to Example 2 in an intermediate focal length state when the zoom lens is focused at infinity.
Figure 8:
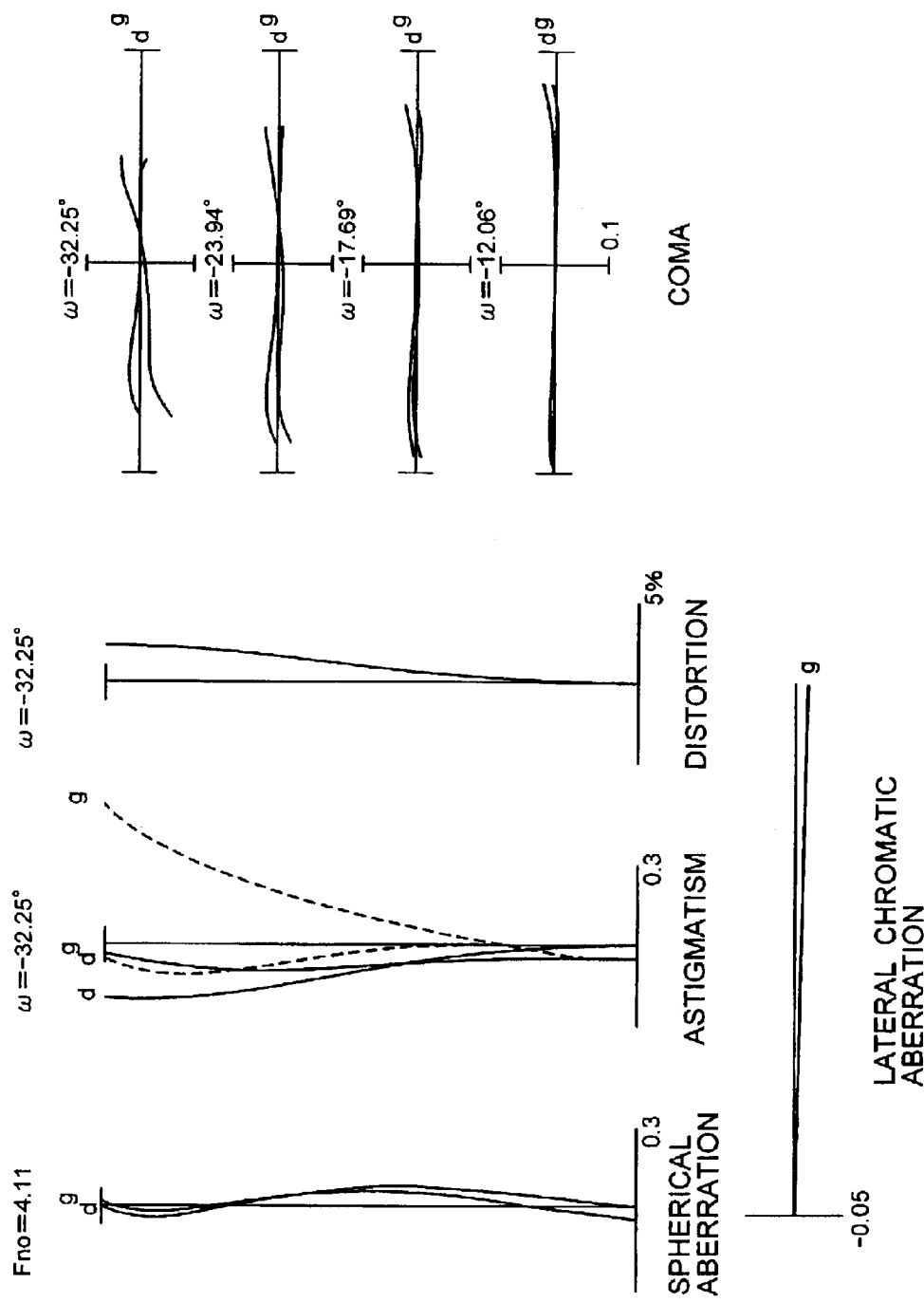
FIG. 8 graphically shows various aberrations of the super wide-angle zoom lens system according to Example 2 in a telephoto end state when the zoom lens is focused at infinity.

FIG. 6 graphically shows various aberrations of the super wide-angle zoom lens system according to Example 2 in a wide-angle end state when the zoom lens is focused at infinity. As is apparent from the graphs, sufficient amount of peripheral quantity of light is secured and excellent compensation is made for the various aberrations. FIG. 7 graphically shows various aberrations of the super wide-angle zoom lens system according to Example 2 in an intermediate focal length state when the zoom lens is focused at infinity. As is apparent from the graphs, excellent compensation is made for the various aberrations. FIG. 8 graphically shows various aberrations of the super wide-angle zoom lens system according to Example 2 in a telephoto end state when the zoom lens is focused at infinity. As is apparent from the graphs, excellent compensation is made for the various aberrations.

As described above, the present invention makes it possible to provide a super wide-angle zoom lens system having an angle of view of 2ω=102° or more, a zoom ratio about two, the f-number of about f/4, sufficient amount of peripheral light quantity, high optical performance, and aspherical surfaces capable of being manufactured easily.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A super wide-angle zoom lens system comprising, in order from an object:

a first lens group having negative refractive power; and
a second lens group having positive refractive power;
zooming being carried out by varying a distance between the first lens group and the second lens group;
the first lens group having
a negative lens component; and
a positive lens component;
the most image side surface of the negative lens component and the most object side surface of the positive lens component are separated by air;
the negative lens component having at least one aspherical lens;
the aspherical lens satisfying the following conditional expressions;

$$2.0 < d\mathrm{max}/d0 < 4.49$$

$$0.6 < (|R\mathrm{max}| - |R\mathrm{min}|)/|R\mathrm{max}| < 1.0$$

$$0.5 < d12/ft < 1.5$$

where d0 denotes the thickness of the aspherical lens along the optical axis, dmax denotes the thickness of the aspherical lens at the maximum effective aperture measured parallel to the optical axis, Rmax denotes the radius of curvature of the aspherical lens on the side having larger absolute value of the paraxial radius of curvature, Rmin denotes the radius of curvature of the aspherical lens on the side having smaller absolute value of the paraxial radius of curvature, d12 denotes a distance along the optical axis between the most image side surface of the aspherical lens and the most object side of a lens immediately after the aspherical lens, and ft denotes the focal length of the zoom lens system in a telephoto end state.

2. The super wide-angle zoom lens system according to claim 1, wherein the negative lens component in the first lens group includes at least a first negative lens component and a second negative lens component, wherein the first negative component includes the aspherical lens, and wherein the following conditional expression is satisfied;

$$-7.0 < f\mathrm{asp}/fw < -1.0$$

where fasp denotes the focal length of the aspherical lens, and fw denotes the focal length of the zoom lens system in a wide-angle end state.

3. The super wide-angle zoom lens system according to claim 2, wherein the second lens group includes a first positive lens component and wherein focusing at a close object is carried out by moving only the first positive lens component in the second lens group.

4. The super wide-angle zoom lens system according to claim 2, wherein the second lens group includes, in order from the object;

a first positive lens component;
a second positive lens component;
a third positive lens component; and
a negative lens component; and
wherein the negative lens component in the second lens group includes a negative lens element having a concave surface facing to the object.

5. The super wide-angle zoom lens system according to claim 4, wherein the negative lens component in the second lens group includes a negative aspherical lens having a concave surface facing to the object.

6. The super wide-angle zoom lens system according to claim 5;

wherein the second positive lens component in the second lens group is composed of a cemented lens constructed by, in order from the object, a positive lens element cemented with a negative lens element;
wherein the third positive lens component in the second lens group is composed of a cemented lens constructed by, in order from the object, a negative lens element cemented with a positive lens element; and
wherein in both the second positive lens component and the third positive lens component, refractive index at d-line of the cemented negative lens element is higher than that of the cemented positive lens element.

7. The super wide-angle zoom lens system according to claim 6, wherein the following conditional expression is satisfied;

$$0.07 < d23/dII < 0.2$$

where d23 denotes a distance between the second positive lens component and the third positive lens component of the second lens group along the optical axis, and dII denotes the total lens length of the second lens group along the optical axis when the zoom lens is focusing at infinity.

8. The super wide-angle zoom lens system according to claim 7, wherein focusing at a close object is carried out by moving only the first positive lens component in the second lens group.

9. The super wide-angle zoom lens system according to claim 4;

wherein the second positive lens component in the second lens group is composed of a cemented lens constructed by, in order from the object, a positive lens element cemented with a negative lens element;
wherein the third positive lens component in the second lens group is composed of a cemented lens constructed by, in order from the object, a negative lens element cemented with a positive lens element; and
wherein in both the second positive lens component and the third positive lens component, refractive index at d-line of the cemented negative lens element is higher than that of the cemented positive lens element.

10. The super wide-angle zoom lens system according to claim 4, wherein the following conditional expression is satisfied;

$$0.07 < d23/dII < 0.2$$

where d23 denotes a distance between the second positive lens component and the third positive lens component of the second lens group along the optical axis, and dII denotes the total lens length of the second lens group along the optical axis when the zoom lens is focusing at infinity.

11. The super wide-angle zoom lens system according to claim 4, wherein focusing at a close object is carried out by moving only the first positive lens component in the second lens group.

12. The super wide-angle zoom lens system according to claim 1, wherein the second lens group includes, in order from the object;
 a first positive lens component;
 a second positive lens component;
 a third positive lens component; and
 a negative lens component; and
 wherein the negative lens component in the second lens group includes a negative lens element having a concave surface facing to the object.

13. The super wide-angle zoom lens system according to claim 12;
 wherein the second positive lens component in the second lens group is composed of a cemented lens constructed by, in order from the object, a positive lens element cemented with a negative lens element;
 wherein the third positive lens component in the second lens group is composed of a cemented lens constructed by, in order from the object, a negative lens element cemented with a positive lens element; and
 wherein in both the second positive lens component and the third positive lens component, refractive index at d-line of the cemented negative lens element is higher than that of the cemented positive lens element.

14. The super wide-angle zoom lens system according to claim 12, wherein the following conditional expression is satisfied;

$$0.07 < d23/dII < 0.2$$

where d23 denotes a distance between the second positive lens component and the third positive lens component of the second lens group along the optical axis, and dII denotes the total lens length of the second lens group along the optical axis when the zoom lens is focusing at infinity.

15. The super wide-angle zoom lens system according to claim 12, wherein focusing at a close object is carried out by moving only the first positive lens component in the second lens group.

16. The super wide-angle zoom lens system according to claim 12, wherein the negative lens component in the second lens group includes a negative aspherical lens having a concave surface facing to the object.

17. The super wide-angle zoom lens system according to claim 16, wherein the following conditional expression is satisfied;

$$0.07 < d23/dII < 0.2$$

where d23 denotes a distance between the second positive lens component and the third positive lens component of the second lens group along the optical axis, and dII denotes the total lens length of the second lens group along the optical axis when the zoom lens is focusing at infinity.

18. The super wide-angle zoom lens system according to claim 16, wherein focusing at a close object is carried out by moving only the first positive lens component in the second lens group.

19. The super wide-angle zoom lens system according to claim 16;
 wherein the second positive lens component in the second lens group is composed of a cemented lens constructed by, in order from the object, a positive lens element cemented with a negative lens element;
 wherein the third positive lens component in the second lens group is composed of a cemented lens constructed by, in order from the object, a negative lens element cemented with a positive lens element; and
 wherein in both the second positive lens component and the third positive lens component, refractive index at d-line of the cemented negative lens element is higher than that of the cemented positive lens element.

20. The super wide-angle zoom lens system according to claim 19, wherein the following conditional expression is satisfied;

$$0.07 < d23/dII < 0.2$$

where d23 denotes a distance between the second positive lens component and the third positive lens component of the second lens group along the optical axis, and dII denotes the total lens length of the second lens group along the optical axis when the zoom lens is focusing at infinity.

21. The surer wide-angle zoom lens system according to claim 20, wherein focusing at a close object is carried out by moving only the first positive lens component in the second lens group.

22. The super wide-angle zoom lens system according to claim 1, wherein the second lens group includes a first positive lens component and wherein focusing at a close object is carried out by moving only the first positive lens component in the second lens group.

23. A super wide-angle zoom lens system consisting of, in order from an object:
 a first lens group having negative refractive power; and
 a second lens group having positive refractive power;
 zooming being carried out by varying a distance between the first lens group and the second lens group;
 the first lens group having
 a negative lens component; and
 a positive lens component;
 the most image side surface of the negative lens component and the most object side surface of the positive lens component are separated by air;
 the negative lens component having at least one aspherical lens;
 the aspherical lens satisfying the following conditional expression;

$$2.0 < d\mathrm{max}/d0 < 6.0$$

where d0 denotes the thickness of the aspherical lens along the optical axis, dmax denotes the thickness of the aspherical lens at the maximum effective aperture measured parallel to the optical axis.

24. The super wide-angle zoom lens system according to claim 23, wherein the negative lens component in the first lens group includes at least a first negative lens component and a second negative lens component, wherein the first negative component includes the aspherical lens, and wherein the following conditional expression is satisfied;

$$-7.0 < fasp/fw < -1.0$$

where fasp denotes the focal length of the aspherical lens, and fw denotes the focal length of the zoom lens system in a wide-angle end state.

25. The super wide-angle zoom lens system according to claim 23, wherein:

the aspherical lens satisfies the following conditional expression:

$$0.6 < (|Rmax| - |Rmin|)/|Rmax| < 1.0$$

where Rmax denotes the radius of curvature of the aspherical lens on the side having larger absolute value of the paraxial radius of curvature, Rmin denotes the radius of curvature of the aspherical lens on the side having smaller absolute value of the paraxial radius of curvature.

26. The super wide-angle zoom lens system according to 25, claim wherein the aspherical lens satisfies the following conditional expression;

$$0.5 < d12/ft < 1.5$$

where d12 denotes a distance along the optical axis between the most image side surface of the aspherical lens and the most object side of a lens immediately after the aspherical lens, and ft denotes the focal length of the zoom lens system in a telephoto end state.

27. The super wide-angle zoom lens system according to claim 23, wherein:

the aspherical lens satisfies the following conditional expression;

$$0.5 < d12/ft < 1.5$$

where d12 denotes a distance along the optical axis between the most image side surface of the aspherical lens and the most object side of a lens immediately after the aspherical lens, and ft denotes the focal length of the zoom lens system in a telephoto end state.

28. A super wide-angle zoom lens system consisting of, in order from an object:

a first lens group having negative refractive power; and a second lens group having positive refractive power;

zooming being carried out by varying a distance between the first lens group and the second lens group;

the first lens group having a negative lens component; and a positive lens component;

the most image side surface of the negative lens component and the most object side surface of the positive lens component are separated by air;

the negative lens component having at least one aspherical lens;

the aspherical lens satisfying the following conditional expression;

$$0.6 < (|Rmax| - |Rmin|)/|Rmax| < 1.0$$

where Rmax denotes the radius of curvature of the aspherical lens on the side having larger absolute value of the radius of curvature, Rmin denotes the radius of curvature of the aspherical lens on the side having smaller absolute value of the radius of curvature.

29. The super wide-angle zoom lens system according to claim 28, wherein the negative lens component in the first lens group includes at least a first negative lens component and a second negative lens component, wherein the first negative component includes the aspherical lens, and wherein the following conditional expression is satisfied;

$$-7.0 < fasp/fw < -1.0$$

where fasp denotes the focal length of the aspherical lens, and fw denotes the focal length of the zoom lens system in a wide-angle end state.

* * * * *